(12) United States Patent
Hirano et al.

(10) Patent No.: US 9,497,176 B2
(45) Date of Patent: Nov. 15, 2016

(54) COMMUNICATION SYSTEM, USER EQUIPMENT AND COMMUNICATION NODE

(75) Inventors: Jun Hirano, Kanagawa (JP); Shinkichi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 500 days.

(21) Appl. No.: 13/502,719

(22) PCT Filed: Oct. 8, 2010

(86) PCT No.: PCT/JP2010/006032
§ 371 (c)(1),
(2), (4) Date: Apr. 18, 2012

(87) PCT Pub. No.: WO2011/048768
PCT Pub. Date: Apr. 28, 2011

(65) Prior Publication Data
US 2012/0208506 A1 Aug. 16, 2012

(30) Foreign Application Priority Data
Oct. 21, 2009 (JP) ................................. 2009-242274

(51) Int. Cl.
*H04M 1/66* (2006.01)
*H04L 29/06* (2006.01)
(Continued)

(52) U.S. Cl.
CPC .............. *H04L 63/08* (2013.01); *H04W 12/06* (2013.01); *H04W 8/12* (2013.01)

(58) Field of Classification Search
CPC .......................... H05W 12/06; H04L 63/0272
(Continued)

(56) References Cited

U.S. PATENT DOCUMENTS 8,484,704 B2 * 7/2013 Chavez et al. .................... 726/5
2004/0028009 A1 * 2/2004 Dorenbosch ...... H04W 36/0011
370/329

(Continued)

FOREIGN PATENT DOCUMENTS

JP 2003-169075 6/2003
JP 2007-097010 4/2007
(Continued)

OTHER PUBLICATIONS

International Search Report dated Dec. 21, 2010.
(Continued)

*Primary Examiner* — Chuck Huynh
(74) *Attorney, Agent, or Firm* — Dickinson Wright PLLC

(57) ABSTRACT

Disclosed is a technique to enable a user equipment at a remote place to perform local IP access to a locally-accessible network with simpler procedure and such a configuration while achieving the efficiency of costs and facility. According to the technique, a network (LIA-PDN 161) capable of dealing with a local IP access by a user equipment (UE 101) is placed on a core network 141. When the UE establishes a PDN connection with the LIA-PDN, the UE simultaneously transmits information concerning the LIA domain network 111 as well, to which the UE wants a local IP access. On the basis of this information, the LIA-PDN establishes a PDN connection with the LIA domain network, and the LIA-PDN transfers a packet, whereby the UE can access the LIA domain network via these PDN connections.

14 Claims, 5 Drawing Sheets

(51) Int. Cl.
*H04W 12/06* (2009.01)
*H04W 8/12* (2009.01)

(58) Field of Classification Search
USPC ............... 455/411, 436, 443, 444; 726/15
See application file for complete search history.

(56) References Cited

U.S. PATENT DOCUMENTS

| | | | | |
|---|---|---|---|---|
| 2007/0079368 | A1* | 4/2007 | Takeyoshi | H04L 63/0209 726/15 |
| 2008/0155678 | A1* | 6/2008 | Ohkubo et al. | 726/15 |

FOREIGN PATENT DOCUMENTS

| | | |
|---|---|---|
| JP | 2009-512367 | 3/2009 |
| WO | 03/027859 | 4/2003 |
| WO | 2007/045085 | 4/2007 |
| WO | 2008/125729 | 10/2008 |
| WO | 2010/057120 | 5/2010 |

OTHER PUBLICATIONS

3GPP TS 22.220 V10.0.0, "3$^{rd}$ Generation Partnership Project; Technical Specification Group Services and System Aspects; Services requirements for Home NodeBs and Home eNodeBs (Release 10)," Sep. 2009, pp. 1-22.

3GPP TS 22.220 V9.2.0, "3$^{rd}$ Generation Partnership Project; Technical Specification Group Services and System Aspects; Service requirements for Home NodeBs and Home eNodeBs (Release 9)," Sep. 2009, pp. 1-22.

3GPP TS 23.401 V9.1.0, "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)," Jun. 2009, pp. 1-234.

3GPP TS 23.402 V9.1.0, "3$^{rd}$ Generation Partnership Project; Technical Specification Group Services and System Aspects; Architecture enhancements for non-3GPP accesses (Release 9)," Jun. 2009, pp. 1-195.

* cited by examiner

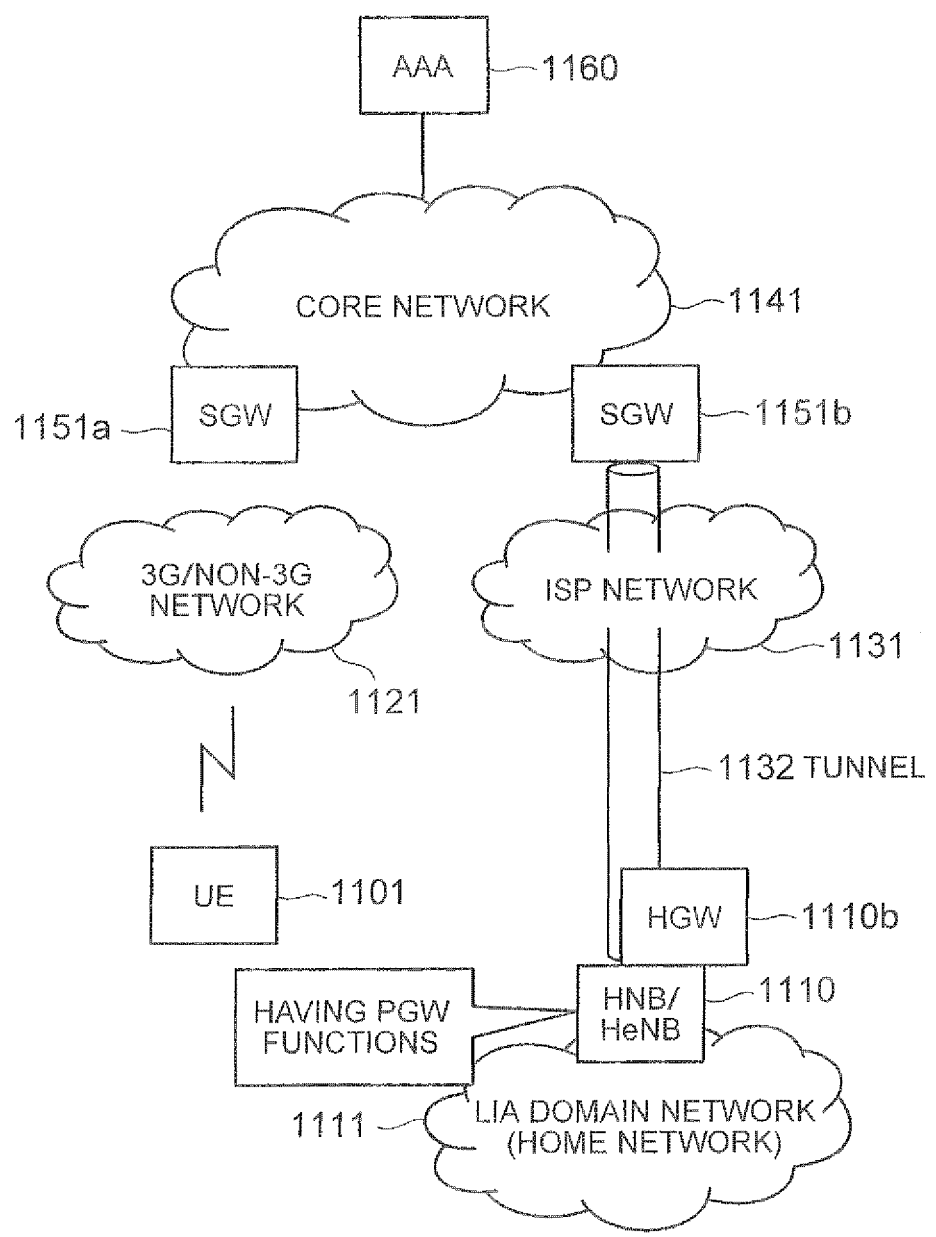

COMMUNICATION SYSTEM, USER EQUIPMENT AND COMMUNICATION NODE

TECHNICAL FIELD

The present invention relates to a communication technique allowing user equipment located in a certain network to access a resource located in another network. The present invention particularly relates to a communication system, a user equipment and a communication node related to local IP access (LIA) using a mobile user equipment.

BACKGROUND ART

As mobile communication techniques progress, a home nodeB (HNB) or a home eNodeB (HeNB) to be placed as a smaller access node is introduced as means for configuring a wireless access network in the 3rd Generation Partnership Program (3GPP). Such a smaller access node can expand the service coverage provided to users of the equipment and can provide users with new services at a low cost and at very high speed. Further, conventional utilization form by users of a broadband network also can be diversified and communication resources required by mobile phone operators can be provided at a low cost. This means that the connection via a HNB or a HeNB typically can provide users with decreased cost and additional services.

Access nodes for customer or campus premises introduced allow the 3GPP to further produce a utilization case in a local IP access (LIA or LIPA) disclosed in Non-Patent Document 1 described below, for example. The LIA allows users accessing a closed subscriber group (CSG) cell of the HNB/HeNB to access a core network of an operator as well as a network connected to the HNB/HeNB. This LIA further includes an access to a domestic (home) network or to the Internet without passing through the core network of the operator. A UE is requested to access the LIA and the core network of the operator simultaneously, and the 3GPP further examines a case where a UE is allowed to perform LIA via a macro-cell.

These new utilization cases have the possibility of improving the value of services to be developed in the future, and are effective to perform offloading of a certain amount of traffic from the core network. Conceivably in this case, a conventional operation procedure specified in the following Non-Patent Document 2 can be reused to embody these scenarios.

In the present specification, in order to distinguish home networks (this may be called a HPLMN: Home Public Land Mobile Network) meaning a network of a 3GPP operator having a major contract relationship with a certain UE from home networks meaning a domestic (home) network connected to a certain HNB/HeNB that is viewed from the owner of the network, the former is described as a HPLMN and the latter is described as a LIA domain network.

As a technique relating to the present invention, the invention disclosed in the following Patent Document 1 is known. In the invention disclosed in Patent Document 1, a UE is configured to detect whether a local breakout service is available or not in an IP (Internet Protocol) gateway announced by a base station of the UE. This UE can form an Internet protocol stack to use a local breakout service on the Internet while continuously using a 3GPP service.

PRIOR ART DOCUMENT

Patent Document

Patent Document 1: PCT Application Publication No. WO 2008/125729

Non-Patent Document

Non-Patent Document 1: Service requirements for Home NodeB (HNB) and Home eNodeB (HeNB), 3GPP TS22.220 V9.2.0 Release 9, 2009-09.

Non-Patent Document 2: General Packet Radio Service (GPRS) enhancements for Evolved Universal Terrestrial Radio Access Network (E-UTRAN) access, 3GPP TS23.401 V9.1.0 Release 9, 2009-6.

Non-Patent Document 3: Architecture enhancements for non-3GPP accesses, 3GPP TS23.402 V9.1.0 Release 9, 2009-6.

There may be a state where a UE has a wireless communication function and accesses a network away from a LIA domain network that the UE wants to connect (i.e., the UE is at a remote place). In this case, the UE may want to communicate with a network node connected to the LIA domain network from the currently connected network. Herein, the network that the UE currently connects may be a 3GPP network or a non-3GPP network. The UE may connect directly to a HPLMN or to a different PLMN by roaming or the like.

Exemplary states where the UE wants to communicate with a node connected to the LIA domain network from the currently connected network include a case where a user accesses his/her own data server provided at home to fetch information therefrom and a case where a user stores data acquired away from home to his/her own data server.

However, since the architecture for HNB/HeNB is special, the problem of inefficiency exists for the LIA. For instance, since a HNB/HeNB connects to a core network of an operator via an ISP network, the performance via this link has a limitation on a band, delay or the like. According to the architecture specified in Non-Patent Document 2, every traffic from a UE has to pass through a PDN gateway (PGW: Packet Data Network (PDN) gateway) and a serving gateway (SGW) placed in an EPC (Evolved Packet Core). This is for both purposes of the necessity of legalized communication interception of data traversing a network of a mobile operator when the UE performs LIA at a remote place and of the accounting. Such necessity, however, means that every data to be exchanged has to pass through gateways relating to a session (connection) set. In such a scenario, an appropriate gateway has to be searched or data has to pass through a gateway at a specific position irrespective of a connection state, thus causing increases in cost and inefficient and ineffective case.

According to the invention disclosed in Patent Document 1, a UE can form an Internet protocol stack to use a local breakout service on the Internet while continuously using a 3GPP service. In this solution, however, a SGW connectable with a target LIA domain network cannot be set effectively because maximum advantages of each mode are sought without influences.

Now the following describes the procedure for LIA to a LIA domain network using a conventional technique when a UE is at a remote place. FIG. 6 illustrates a network configuration to describe the procedure for LIA to a LIA domain network using a conventional technique when a UE is at a remote place. Using a conventional technique, LIA can be implemented by the following procedure, for example.

For instance, a function as a PGW (and a function as a SGW as needed) is implemented in a HeNB 1110 (hereinafter described as a HNB/HeNB 1110) or a HNB 1110b, whereby a LIA domain network (home network) 1111 is configured as one PDN. To each LIA domain network 1111 is assigned an individual network name (identification information such as APN (Access Point Name)) so as to enable individual access from each UE 1101 of a plurality of users (so that the LIA domain network can be identified uniquely in a network of an operator or the network as a whole in a roaming relationship).

When a UE 1101 at a remote place performs LIA to the LIA domain network 1111, the HNB/HeNB 1110 functions as a PGW. Therefore, the HNB/HeNB 1110 refers to authentication information to authenticate the UE 1101 from an authentication server (e.g., an AAA server 1160) in the core network to perform authentication processing.

Normally the UE connects to a SGW (e.g., a SGW 1151a) in charge of an access network (3G/non-3G network 1121) as a connection point thereof. In the case of LIA, however, since a tunnel (tunnel passing through an ISP network 1131) 1132 between the HNB/HeNB 1110 and a core network 1141 has to be used, the UE connects to a SGW (e.g., SGW 1151b) setting this tunnel 1132.

Then, the UE 1101 connects to the SGW setting the tunnel between the HNB/HeNB 1110 and the core network 1141 via the ISP network 1131 and performs LIA while setting the HNB/HeNB 1110 as a PGW to communicate with a node on the LIA domain network 1111.

This LIA procedure using a conventional technique, however, has some problems.

For example, the aforementioned configuration to implement the LIA procedure using a conventional technique is large in scale for a method for configuring a network for personal use (a personal house corresponding to one PLMN). For instance, in the above configuration, the HNB/HeNB 1110 has to have a function as a PGW. A PGW typically has a central role of core network operation, and the function of this PGW is very sophisticated. That is, when the HNB/HeNB 1110 has a function as a PGW, the costs of a device unfortunately increases.

Further, each HeNB 1110/HeNB of the LIA domain network (home network) 1111 that a user provides needs identification information (APN) to specify it as a PDN. Since identification information has to be allocated to the LIA domain networks 1111 of individual users, a lot of address space for the allocation of identification information is required. As a result, the load of name solution increases, and the facility of the core network 1141 has to be enhanced.

Further, in order to let the HNB/HeNB 1110 authenticate the UE 1101 as a PGW, the AAA server 1160 in the core network 1141 has to be used. For such authentication, further sufficient security (security achieved by the facility of the core network 1141, for example) might be required for the HNB/HeNB 1110, thus further increasing the device costs.

These problems of the necessity for a function as a PGW to be implemented, the address space of identification information (APN) and enhancement of security results from a function as a PGW that is provided in a personal use network to implement a function as a PDN. The installation of a PGW and the configuration of a PDN are large in scale such that communication common carriers (operators) normally perform such setting. It is implausible to perform such setting on a personal level from the viewpoint of costs and facility maintenance.

Further, according to the typical procedure, the UE 1101 connects to the SGW 1151a in charge of an access network as a connection point thereof. According to the above procedure, however, the UE 1101 has to search for and connect to the SGW 1151b managing a tunnel between the HNB/HeNB 1110 and the core network 1141 for LIA. At this time, the following problems occur unlike the typical case of connection to the SGW 1151a managing the network that the UE 1101 accesses. That is, some devise is required such as designation of an appropriate SGW (SGW 1151b) (holding information associated with some identification information on the SGW) and setting of a connection to the SGW located at a different place, and processing load at the core network 1141 further increases.

As stated above, when the procedure and the configuration to allow a UE at a remote place to perform LIA to a LIA domain network are implemented using a conventional technique, it is required to implement sophisticated functions corresponding to a core network and connection setting concerning the network as a whole on the core network side. Therefore, the facility, the procedure costs and the load at each of the core network, the HNB/HeNB and the UE unfortunately increase greatly.

SUMMARY OF THE INVENTION

In view of the above-stated problems, it is an object of the present invention to provide a communication system, a user equipment and a communication node enabling a UE at a remote place to perform LIA to a LIA domain network with simpler procedure and such a configuration while achieving the efficiency of costs and facility.

In order to fulfill the above-stated object, a communication system of the present invention enables a user equipment capable of performing an local IP access to a first network perform a local IP access to the first network while connecting the user equipment to a second network that is physically different from the first network. The communication system includes: a packet data network for local IP access placed in a core network, the packet data network for local IP access being capable of dealing with the local IP access by the user equipment. The user equipment transmits information necessary for authentication of a local IP access to the first network to the packet data network for local IP access when establishing a packet data network connection with the packet data network for local IP access, and when the packet data network for local IP access performs authentication processing concerning the local IP access by the user equipment to the first network and validity thereon is confirmed, the user equipment establishes a connection to perform the local IP access to the first network.

This configuration enables a UE at a remote place to perform LIA to a LIA domain network with simpler procedure and such a configuration while achieving the efficiency of costs and facility.

In order to fulfill the above-stated object, a user equipment of the present invention is capable of performing an local IP access to a first network in a communication system, the communication system enabling the user equipment perform a local IP access to the first network while connecting the user equipment to a second network that is physically different from the first network. The user equipment includes: a unit that transmits, to a packet data network for local IP access placed in a core network, information necessary for authentication of a local IP access to the first network when establishing a packet data network connection with the packet data network for local IP access capable of dealing with a local IP access by the user equipment, and a unit that performs, when the packet data network for local IP access performs authentication processing concerning the local IP access by the user equipment to the first network and validity thereon is confirmed, a local IP access to the first network via a connection to perform a local IP access to the first network established via the packet data network for local IP access.

This configuration enables a UE at a remote place to perform LIA to a LIA domain network with simpler procedure and such a configuration while achieving the efficiency of costs and facility.

In order to fulfill the above-stated object, a communication node of the present invention is in a first network in a communication system, the communication system enabling a user equipment capable of performing an local IP access to the first network perform a local IP access to the first network while connecting the user equipment to a second network that is physically different from the first network. The communication node includes: the user equipment performing a local IP access to the first network via a connection to a packet data network for local IP access placed in a core network, the packet data network for local IP access being capable of dealing with the local IP access; and a unit that transfers a packet to be communicated with a node in the first network as an access target of the user equipment.

This configuration enables a UE at a remote place to perform LIA to a LIA domain network with simpler procedure and such a configuration while achieving the efficiency of costs and facility.

In order to fulfill the above-stated object, a communication node of the present invention is in a packet data network for local IP access placed in a core network, the packet data network for local IP access being capable of dealing with a local IP access by a user equipment capable of performing a local IP access to a first network in a communication system, the communication system enabling the user equipment perform a local IP access to the first network while connecting the user equipment to a second network that is physically different from the first network. The communication node includes: a unit that receives information necessary for authentication of a local IP access to the first network, the information being transmitted when the user equipment establishes a packet data network connection with the packet data network for local IP access; a unit that performs, on a basis of the information necessary for authentication of a local IP access to the first network, authentication processing concerning the local IP access by the user equipment to the first network; and a unit that, when validity of the local IP access by the user equipment to the first network is confirmed in the authentication processing, establishes a connection where the user equipment performs the local IP access to the first network.

This configuration enables a UE at a remote place to perform LIA to a LIA domain network with simpler procedure and such a configuration while achieving the efficiency of costs and facility.

The aforementioned configurations of the present invention can lead to an effect of enabling a UE at a remote place to perform LIA to a LIA domain network with simpler procedure and such a configuration while achieving the efficiency of costs and facility.

BRIEF DESCRIPTION OF THE DRAWINGS

FIG. 6 illustrates a network configuration to describe the procedure for LIA to a LIA domain network using a conventional technique when a UE is at a remote place.

DESCRIPTION OF EMBODIMENTS

The following describes embodiments of the present invention, with reference to the drawings.

Figure 1:
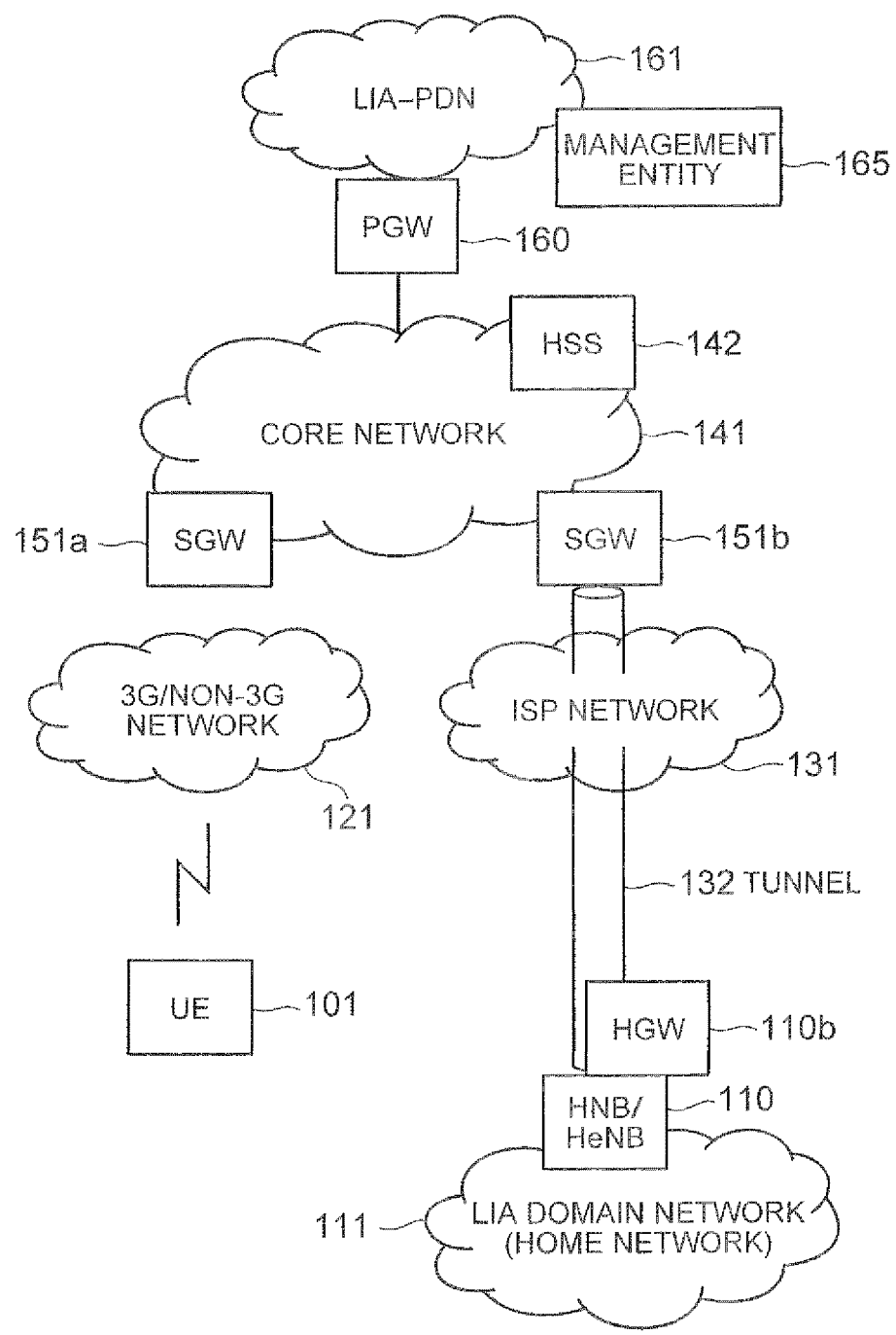
FIG. 1 illustrates an exemplary network configuration in one embodiment of the present invention.

Referring firstly to FIG. 1, an exemplary network configuration in one embodiment of the present invention is described below. FIG. 1 illustrates an exemplary network configuration in one embodiment of the present invention.

A UE 101 (user terminal, communication terminal) of FIG. 1 has a function of transmitting information indicating that the UE 101 tries to perform LIA while keeping a state where the UE 101 connects to an access network (e.g., a 3G/non-3G network 121) different from a LIA domain network (home network) 111. Examples of available information indicating that the UE tries to perform LIA includes an APN of a PDN (hereinafter this may called a LIA-PDN 161) capable of dealing with LIA and other specific information of the LIA-PDN 161 (e.g., information such as a domain name or an address range).

The UE 101 further has a function of transmitting information necessary to perform authentication as to whether the UE 101 has access authority to a LIA-PDN or not (authentication relating to the establishment of a PDN connection). The UE 101 still further has a function of transmitting information necessary for authentication to a specific LIA domain network 111 that the UE 101 wants to connect (information specifying the LIA domain network 111, information specifying a HNB/HeNB 110 in the LIA domain network 111, identification information on the UE 101 necessary to access the LIA domain network 111, authentication information such as key information and the like).

The UE 101 may transmit information necessary to perform authentication to the LIA domain network 111 at the same time as information necessary to perform authentication concerning the establishment of a PDN connection with the LIA-PDN 161 (collectively as one message), or may transmit the information necessary to perform authentication to the LIA domain network 111 after transmitting the information necessary to perform authentication concerning the establishment of a PDN connection. In the present invention (especially in the case of a connection form of a MuPDN type described later), it is desirable that the UE 101 add the information that the UE tries to perform LIA to the information necessary to perform authentication concerning the establishment of a PDN connection with the LIA-PDN 161 for transmission.

The UE 101 further may have a function of determining whether LIA is to be performed or not (e.g., determining the necessity of accessing theirs own data server provided at home to fetch information therefrom or the necessity of storing data acquired away from home to their own data server) and when it is determined that the LIA is to be performed, activating a transmission operation of information indicating that the UE tries to perform LIA (e.g., information such as an APN including a flag, a bit string, a character string or the like added thereto to indicate the LIA).

Figure 3:
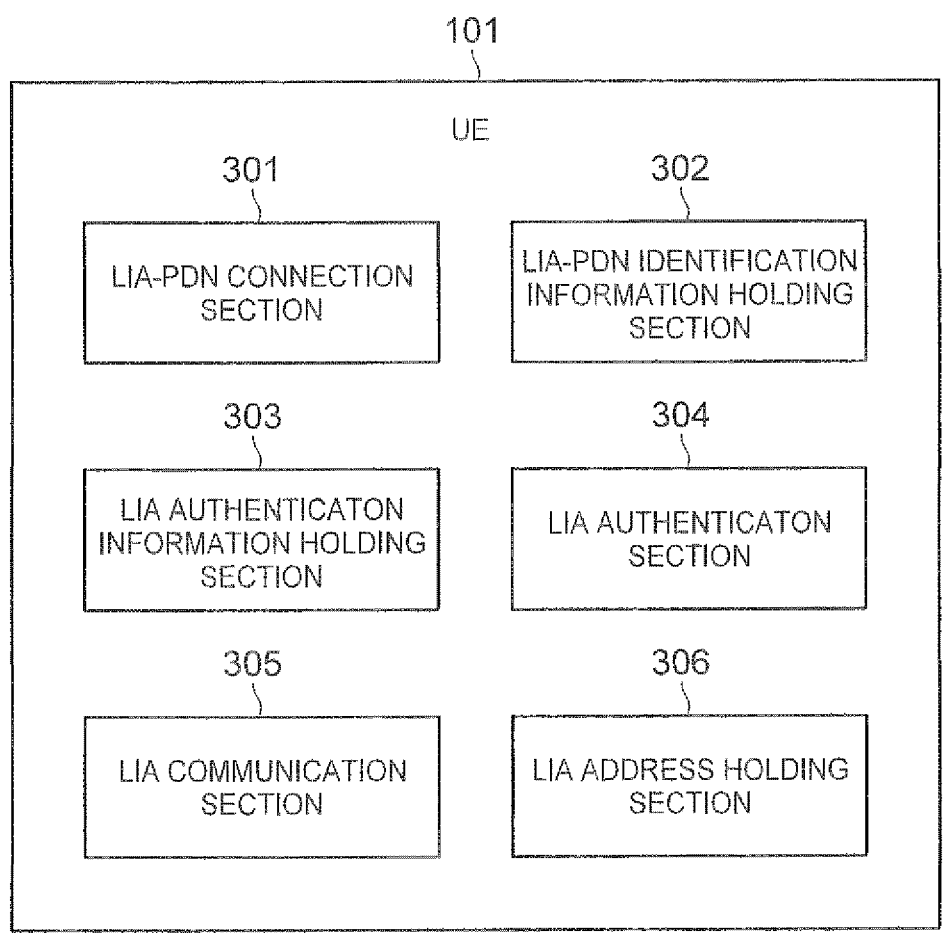
FIG. 3 is a schematic block diagram illustrating an exemplary configuration of a UE 101 in one embodiment of the present invention.

The functions of the UE 101 may be implemented by the configuration of the UE 101 illustrated in FIG. 3, for example. FIG. 3 is a schematic block diagram illustrating an exemplary configuration of the UE 101 in the present embodiment.

The UE 101 illustrated in FIG. 3 includes a LIA-PDN connection section 301 that requests a connection to a LIA-PDN during access authentication; a LIA-PDN identification information holding section 302 that holds an ID (e.g., an APN) of the LIA-PDN as a PDN to perform LIA; a LIA authentication information holding section 303 that holds information concerning access authentication at a second stage (authentication for access to the LIA domain network 111) in addition to normal access authentication (access authentication for connection with a 3GPP network and a LIA-PDN); a LIA authentication section 304 that performs access authentication to the LIA domain network 111 following normal access authentication; a LIA communication section 305 that communicates with the LIA domain network 111; and a LIA address holding section 306 that holds an address for an access to the LIA domain network 111.

Herein, in operatively associated with a connection request to a LIA-PDN by the LIA-PDN connection section 301, the LIA authentication section 304 can inform a PGW 160 or the LIA-PDN 161 of authentication information to access the LIA domain network 111 (information concerning access authentication at the second stage). For instance, the UE 101 may have a function of adding the access authentication information at the second stage to the connection request to the LIA-PDN (e.g., setting a PCO (Protocol Configuration Options)).

Alternatively, information necessary for authentication to access the LIA domain network 111 may be added to information necessary for access authentication to connect with the LIA-PDN included in the connection request to the LIA-PDN by the LIA-PDN connection section 301. That is, the information necessary for authentication to access the LIA domain network 111 may be included in the connection request to the LIA-PDN by the LIA-PDN connection section 301 and may be reported to the PGW 160 together with the information necessary for access authentication to connect to the LIA-PDN. At this time, the both pieces of information are collected as an APN format such as "user@HomeAccPDN.MyLIA" (HomeAccPDN is an identifier indicating LIA-PDN and MyLIA is an identifier indicating the LIA domain network 111. Instead of the identifiers, a password for authentication or an authentication code may be added), whereby communication traffic to report necessary information can be reduced and usage efficiency of resources can be improved.

The LIA-PDN connection section 301 further includes a connection function to a conventional PDN that a conventional UE has, and uses an ID of a LIA-PDN when making a connection request to the LIA-PDN. The LIA address holding section 306 holds an address to be used when LIA is actually performed, and a method of acquiring the address (method of allocating an address to the UE 101) can be implemented with several methods described later. Several connection forms are available as a connection form between the UE 101 and the LIA domain network 111 as well, as described later. For instance, the UE 101 may have a function of performing the procedure to configure an IP-IP tunnel with a node in the LIA domain network 111.

The PGW 160 has a function of configuring the PDN (LIA-PDN) 161 that manages and transfers the processing when local IP access is performed remotely. Herein, the LIA-PDN 161 preferably is configured to deal with LIA irrespective of to what LIA domain network what UE 101 tries to connect. The LIA-PDN 161 preferably has a predetermined APN assigned thereto and is configured to be easily specified.

The LIA-PDN 161 is provided with a management entity 165. The management entity 165 has a function of performing normal access authentication (first authentication processing) to authenticate as to whether the UE 101 has authority to establish a PDN connection with the LIA-PDN 161 or not and a function of performing authentication processing (second authentication processing) to authenticate as to whether the UE 101 is accessible to the LIA domain network 111 or not.

Herein, the PGW 160 may perform the first authentication processing (authentication for PDN connection establishment) in operatively associated with a HSS 142 (Home Subscriber Server: a node that holds and manages subscriptions and contexts of a UE and executes connection authentication to a core network. Since the HSS may be described in a physically and logically integrated manner with an AAA (Authentication, Authorization and Accounting) server which executes or involves authentication for connection via Non-3GPP access, the HSS may be called an AAA/HSS or the like hereinafter). At this time, the management entity executes the second authentication processing only.

The management entity 165 further has a function of, after completing the aforementioned first and second authentication processing, connecting the UE 101 to the LIA domain network 111. Several connection forms are available as the connection between the UE 101 and the LIA domain network 111 in this case, for example, including a tunnel type or a MuPDN type described later.

Figure 4:
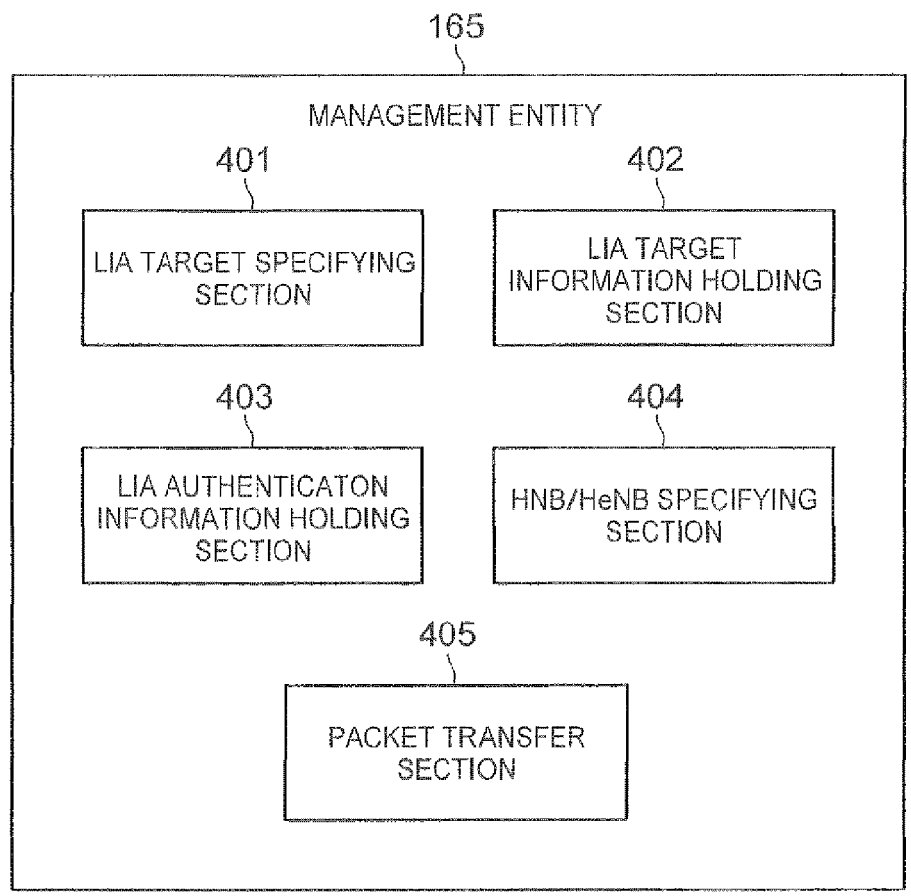
FIG. 4 is a schematic block diagram illustrating an exemplary configuration of a management entity 165 in one embodiment of the present invention.

These functions of the management entity 165 may be implemented by the configuration of the management entity 165 illustrated in FIG. 4, for example. FIG. 4 is a schematic block diagram illustrating an exemplary configuration of the management entity 165 in one embodiment of the present invention.

The management entity 165 illustrated in FIG. 4 includes: a LIA target specifying section 401 that specifics the LIA domain network 111 as a target of the UE 101 via access authentication of the UE 101; a LIA target information holding section 402 that holds a list to identify the LIA domain network 111; a LIA authentication information holding section 403 that holds authentication information to the LIA domain network 111; a HNB/HeNB specifying section 404 that specifies the HNB/HeNB 110 configuring the LIA domain network 111; and a packet transfer section 405 that transfers a packet exchanged between the UE 101 and the LIA domain network 111.

The management entity 165 of the LIA-PDN 161 may have a function, depending on an address allocation method to the UE 101 and a connection form between the UE 101 and the LIA domain network 111 described later, of establishing a connection to the HNB/HeNB 110 specified by the HNB/HeNB specifying section 404, a function of transferring a packet based on information of connection between the corresponding UE 101 and the HNB/HeNB 110, a function of transferring a packet by IP routing (or instructing a routing entity to transfer a packet) and the like.

The LIA domain network 111 is a network connected to a foreign network such as an ISP network 131 via a certain HNB/HeNB 110 or a HGW 110b, and is a network (home network) with which the UE 101 has authority to perform LIA. In the present invention, the HNB/HeNB 110 has a function of processing calling (paging, authentication, connection setting or similar functions) from a network and a routing function of a packet to the outside of the LIA domain network 111 (or a packet from the outside of the LIA domain network 111). The HGW 110b, however, may have a function of address allocation to the UE, a routing function or the like especially and may operatively associate with the HNB/HeNB 110. In that case, the HNB/HeNB specifying section 404 of the management entity 165 may specify the HGW 110b in addition to the HNB/HeNB 110 (or instead of the HNB/HeNB 110), and the packet transfer section 405 may transfer a packet not to the HNB/HeNB 110 but to the HGW 110b. Hereinafter the HNB/HeNB 110 may be called a HNB/HeNB 110 including the HGW 110b (especially in the case where the HGW 110b holds the functions of address allocation to the UE and packet transferring separated from the HNB/HeNB 110).

The HNB/HeNB may be a femto cell base station, an Atto cell base station or simply a dedicated short range cell base station or a local cell base station, or may be a so-called access point instead of a base station, all of which can enable the operation in embodiments of the present invention without problems.

The HNB/HeNB 110 has to be authenticated as a HNB/HeNB by the PGW 160 configuring the LIA-PDN 161, and this authentication may be performed in advance or may be performed at the timing when the UE 101 performs LIA to the LIA domain network 111.

Figure 5:
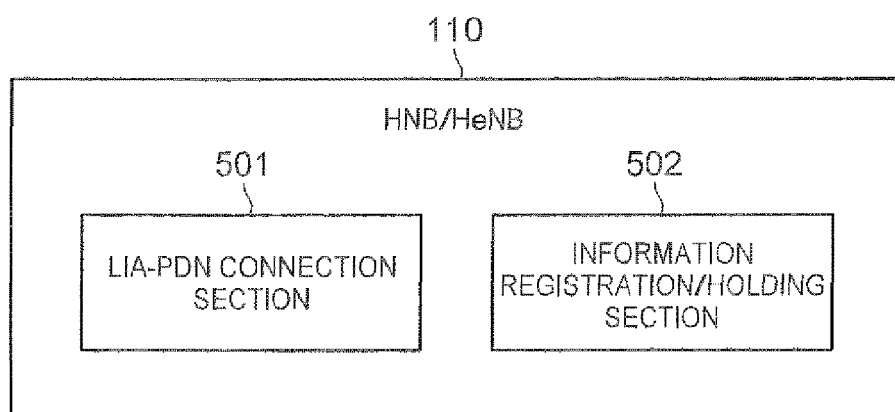
FIG. 5 is a schematic block diagram illustrating an exemplary configuration of a HNB/HeNB 110 in one embodiment of the present invention.

These functions of the HNB/HeNB 110 may be implemented by the configuration of the HNB/HeNB 110 illustrated in FIG. 5, for example. FIG. 5 is a schematic block diagram illustrating an exemplary configuration of the HNB/HeNB 110 in one embodiment of the present invention.

The HNB/HeNB 110 illustrated in FIG. 5 includes: a LIA-PDN connection section 501 that connects to the LIA-PDN 161 via a PGW or using a connection interface specified by the 3GPP; and an information registration/holding section 502 that registers the LIA domain network 111 itself (a LIA domain network name or ID of the HNB/HeNB 110) and access authentication information (including information as to what kind of the UE 101 is permitted).

Herein, the HNB/HeNB 110 may have a function of performing address assignment to the UE 101 in response to a request from the LIA-PDN 161 (this function is unnecessary when an IP address to be assigned to the UE 101 is decided in authentication information and subscriptions in advance), a packet transferring/routing function from the LIA-PDN 161, a function of setting an IP-IP tunnel with the UE 101 and a function of communication control to perform access control based on other authentication information, for example. Alternatively, as described above, the HGW 110b may have a part of these functions (or all of the functions) independently of the HNB/HeNB 110.

The UE 101, the management entity 165 of the LIA-PDN 161, the HNB/HeNB 110 and the like preferably have a connection-configuration selection function of, when scenarios of the address allocation method and the connection configuration such as a connection form are present in a mixed manner, detecting the connection configuration and switching a connection to a variation suited for the detected connection configuration.

As illustrated in FIG. 1, assume that the UE 101 tries to perform LIA in a state where the UE 101 exists in a network outside of the LIA domain network 111. Herein, a network (network outside the LIA domain network 1111) that the UE 101 connects may be a 3GPP network or a non-3GPP network. The UE 101 may connect directly to a HPLMN or may connect to a different PLMN VPLMN: Visited PLMN) by roaming or the like.

Figure 2:
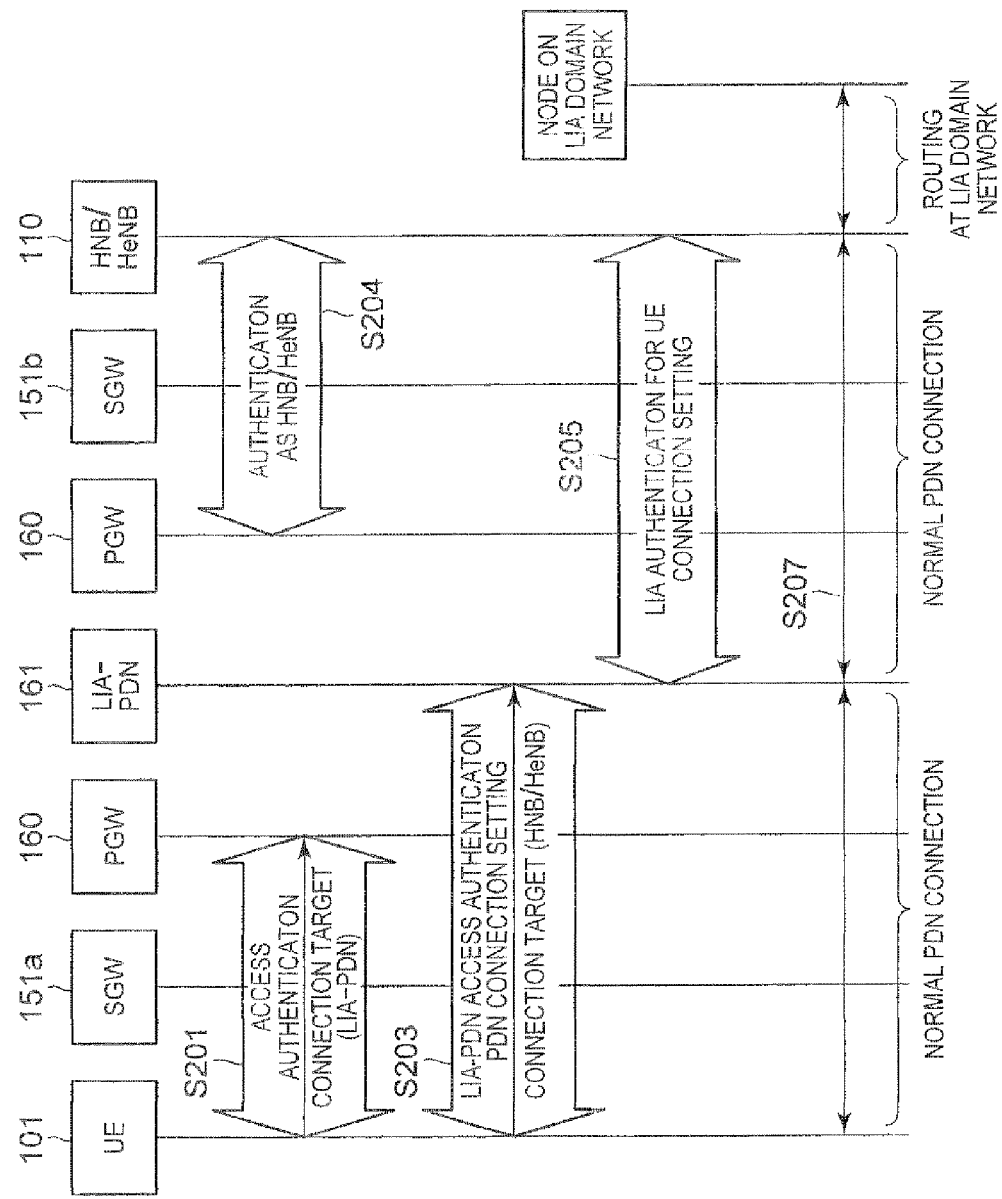
FIG. 2 is a sequence chart illustrating exemplary processing in one embodiment of the present invention.

Referring next to FIG. 2, exemplary processing according to one embodiment of the present invention is described below. FIG. 2 illustrates exemplary processing in the network configuration illustrated in FIG. 1 described above.

Firstly, the UE 101 starts access to a network (a 3G/non 3G network 121 or a 3GPP/non 3GPP network 121) with standard connection procedure to a 3GPP access network as described in Non-Patent Document 2, for example, as usual (or standard connection procedure to a non-3GPP access network as described in Non-Patent Document 2, for example) (Step S201: access authentication). The processing at this Step S201 is to perform access authentication to let the UE 101 establish a basic connection (3GPP/non 3GPP network 121).

Herein, at Step S201, a SGW transferring a connection may be selected with typical procedure. That is, in embodiments of the present invention, the SGW selected at Step S201 does not have to be a special SGW and may be a SGW (SGW 151a) that exists the nearest to a network that the UE 101 connects and is decided from an access network as usual, for example. For instance, such a SGW may be selected with the procedure specified in Non-Patent Document 2. As compared with the case where a SGW concerning the HNB/HeNB 110 is used independently of the access network of the UE 101 (i.e., in the case where in the operation illustrated in FIG. 4 as stated above, a SGW 1151b is selected), this configuration can reduce the load, costs, delay time and the like to select a SOW.

Note here that at Step S201, a PON (LIA-PDN) 161 capable of dealing with LIA is selected as a PDN connection requested by the UE 101. Although preferably the PDN capable of dealing with LIA is a PDN dedicated to dealing with of the LIA, such a PDN may be one that performs processing other than dealing-with LIA (e.g., a conventional PDN) as well.

Irrespective of what LIA domain network 111 the UE 101 tries to connect or what UE 101 tries to perform LIA, the LIA-PDN 161 selected at the PDN connection requested by the UE 101 is common (or one of the limited numbers) and it is preferable not to place a large number of LIA-PDNs 161. That is, it is preferable that one or a small number of LIA-PDNs 161 are present, and a common LIA-PDN 161 is selected irrespective of the LIA domain networks 111 and the UEs 101. Several LIA-PDNs 161 may be present separately for the purposes of the LIA such as for home connection, for business, for area-to-area, for example.

For instance, as an APN (domain name thereof) to allow the UE 101 to designate a PDN connection target, a common name such as "HomeAccPDN" is set for the LIA-PDN 161. At Step S201, the UE 101 that tries to perform LIA transmits the APN ("User@HomeAccPDN") indicating the LIA-PDN 161 together with a request for a PDN connection, whereby a connection request to the LIA-PDN 161 is enabled. In general, the UE 101 designates a PDN (in this case, the LIA-PDN 161) by the APN to establish a PDN connection. Alternatively, the LIA-PDN 161 may be designated by information such as an ID or an address (such as IP address) other than the APN or by transmitting information simply indicating that the UE wants LIA so as to make a core-network 141 side select the LIA-PDN 161 appropriately.

Next, the UE 101 adds and transmits, in the establishment procedure of a PDN connection (i.e., at the time of establishing a connection with the LIA-PDN 161), information necessary to perform authentication to a specific LIA domain network 111 that the UE 101 wants to connect at the LIA-PDN 161 as second-stage authentication (second authentication processing) in addition to normal access authentication (first authentication processing for authentication as to whether the UE 101 has authority for an access to the 3GPP/non 3GPP network 121 including the access network thereof and the LIA-PDN 161) (Step S203: LIA-PDN access authentication, PDN connection setting). The information necessary to perform authentication to a specific LIA domain network 111 that the UE 101 wants to connect indicates, for example, the LIA domain network what HNB/HeNB configures the UE 101 wants to perform LIA in the LIA-PDN 161 or what identification information of the UE 101 at that time is, and the information includes authentication information (key information, authentication code or the like) in the LIA domain network, information (identifier of the LIA domain network 111, an ID of the HNB/HeNB 110, an identifier of the UE 101 or the like) to specify one or more LIA domain networks 111 to which the UE 101 makes a request for connection and the like.

The access authentication at Step S201 (access authentication concerning a connection to the 3GPP/non 3GPP network 121) and the access authentication at Step S203 (access authentication concerning a connection to the LIA-PDN 161) may be performed consecutively as a series of access authentication procedure to set a specific PDN connection. Alternatively, a PDN connection to perform plurality of LIAs may be set at the same time. This is one of excellent points of the present invention resulting from that when the UE 101 performs LIA, a PDN connection can be established centrally at the LIA-PDN 161. For instance, in the case where the HNB/HeNB 110 making up the LIA domain network 111 is configured as a single PDN (i.e., the case of the configuration of FIG. 1 as stated above), a PDN connection has to be set for each different PDN to let the UE 101 perform a plurality of LIAs, and it is difficult to set the PDN connections consecutively and simultaneously during a series of access authentication procedure. On the other hand, according to embodiments of the present invention, PDN connections can be set consecutively or simultaneously during a series of access authentication procedure.

That is a description on new access authentication and PDN connection setting of the UE 101. On the other hand, even when LIA has to be performed following PDN connection (e.g., call with another UE) setting for normal communications, the additional procedure of a PDN connection is used in a similar manner, whereby access authentication to the LIA-PDN 161 can be performed.

The above description deals with the case as a preferable embodiment where information necessary to the first and the second authentication processing is transmitted with one message. Such information, however, may be transmitted with consecutive messages or messages transmitted at different transmission timings.

At Step S203, the PGW 160 and the AAA/HSS 142 or a management entity 165 (e.g., a server that controls to provide the UE 101 with LIA) in the LIA-PDN 161 perform normal access authentication (first authentication processing) as to whether the UE 101 has authority to access the LIA-PDN 161 or not.

Then, when this authentication is performed successfully, the management entity 165 in the LIA-PDN 161 further performs authentication processing (second authentication processing) as to whether the UE 101 is accessible to the LIA domain network 111 as a connection target or not, and when a connection is confirmed with a valid LIA domain network 111 for the UE 101, the management entity 165 starts connection procedure between the UE 101 and the LIA domain network 111 and sets a connection with the HNB/HeNB 110 configuring the LIA domain network 111 to be connected with the UE 101 (Step S205: LIA authentication for UE, connection setting).

During the access authentication to the LIA domain network 111 at Step S205, it is desirable that one or a plurality of sets of an ID (e.g., login ID, UEID, telephone number or IP address) that the UE 101 uses during LIA and an identifier (e.g., CSG-ID, UEID of the HNB/HeNB 110 as a terminal device, telephone number or IP address) of the HNB/HeNB 110 as a target is indicated so as to allow a connection with the HNB/HeNB 110 as a target to be specified.

Such information may be included as authentication information during access authentication to the LIA-PDN 161 at Step S203, or may be set (added) as information elements of PCO to be conveyed to the LIA-PDN 161 (management entity 165) through the procedure where the PGW 160 informs the LIA-PDN 161 of the contents of the PCO.

Herein, the first authentication processing (connection authentication processing to the LIA-PDN 161, Step S203) and the second authentication processing (connection authentication processing to the LIA domain network 111, Step S205) may be performed in temporal synchronization. That is, during PDN connection establishment processing by the UE 101, the first authentication processing and the second authentication processing are performed consecutively (after successful first authentication, the second authentication processing is performed), and when both authentication processing are performed successfully, the PDN connection establishment processing is normally completed. In the case where such authentication processing is performed in an asynchronous manner, a problem impairing user's convenience extremely might occur, e.g., although the first authentication (to the LIA-PDN 161) is performed successfully to inform the UE 101 of the successful PDN connection establishment, the second authentication later (to the LIA domain network 111) fails, so that the previous success notification has to be cancelled. On the other hand, the above processing can prevent such a case, and therefore this processing can improve system stability as well as user's convenience.

In the above description, in the second authentication processing, the management entity 165 alone authenticates an access by the UE 101 to the LIA domain network 111. Instead, the management entity 165 may be a proxy that makes a request for authentication to an authentication server provided separately. Alternatively, authentication by the management entity 165 may be merged with authentication by an authentication server provided separately (individual authentication or cooperative authentication by both of them). Thereby, information necessary for authentication that the management entity 165 holds and manages can be distributed and reduced, whereby load of device management can be reduced. Herein, such an authentication server provided separately may be placed in the LIA domain network 111 or may be placed in another network. The authentication server provided separately may be provided for each UE 101, each user or for each LIA domain network 111, or may be provided to the combination thereof or common to all UEs 101/users and the LIA domain networks 111.

As for the authentication processing between the LIA-PDN 161 and the is HNB/HeNB 110 (Step S204: authentication as the HNB/HeNB 110), the HNB/HeNB 110 performs authentication and sets a communication interface so as to let the HNB/HeNB 110 itself operate as one of access networks in the 3GPP network, thus starting operations of a cell. This processing (Step S204) may be performed in advance, whereby a LIA connection time of the UE 101 can be shortened. The HNB/HeNB 110 configures the LIA domain network 111 and reports information (e.g., its own ID, ID of the UE 101 to be permitted, or authentication information) necessary to perform access authentication of the UE 101 to the LIA domain network 111 in the LIA-PDN 161 (management entity 165). Preferably the HNB/HeNB 110 performs in advance the preparation necessary for calling (connection of the UE 101 that wants to perform LIA with the HNB/HeNB 110) of the HNB/HeNB 110 from the management entity 165 in the LIA-PDN 161. For instance, a secure tunneling may be set for a secure connection to the LIA domain network 111, or the HNB/HeNB 110 may be set as if it were one UE so as to enable the calling with a simple method (using general paging procedure as a method of calling a UE). In that case, a processing section operating as a UE is provided in the HNB/HeNB 110, and at Step S204 the HNB/HeNB 110 performs connection processing to the LIA-PDN 161 like a normal UE. At this time, information necessary to perform access authentication of the UE 101 to the LIA domain network 111 may be reported to the LIA-PDN 161 (management entity 165) via a PGW using PCO or the like.

Such a processing section operating like a UE that is provided in the HNB/HeNB 110 may include physically or logically a SIM card or a medium to hold similar information (e.g., contract information), or information (contract information) stored in the medium such as a SIM card may be different from information for normal UEs, e.g., information for HNB/HeNBs. Thereby, when a function provided to normal UEs and a function provided to HNB/HeNBs are different, mobility support to be provided to normal UEs becomes unnecessary for fixed-type HNB/HeNBs, for example, and in this way the number of functions provided is reduced, whereby contract with operators can be made at a low cost, leading to the improvement of user's advantages.

Several types of connection forms between the UE 101 and the LIA domain network 111 are available. The following describes a "tunnel type" and a "MuPDN type" available as the connection forms between the UE 101 and the LIA domain network 111.

The tunnel type connection form uses a layer-3 tunneling technique known as IP-IP tunnel and performs a communication by encapsulating an IP packet for a communication of the UE 101 with the LIA domain network 111 in the IP connection of a PDN connection where the UE 101 connects to the LIA-PDN 161. When the tunnel type connection form is used, all authentication processing (i.e., the first and the second authentication) is completed, and then the management entity 165 of the LIA-PDN 161 sets a connection to the HNB/HeNB 110 configuring the LIA domain network 111 to be connected with the UE 101. For instance, using a secure tunneling set beforehand, a packet from/to the UE 101 is transferred (routed) to/from a secure tunnel in communication with the LIA domain network 111 as a target to establish a session. When the HNB/HeNB 110 performs setting corresponding to a UE or operates as a function corresponding to a UE, normally performed paging processing to call any UE is performed, and as occasion demands, after a PDN connection is set between the LIA-PDN 161 and the HNB/HeNB 110, transferring (routing) may be performed. On the other hand, the UE 101 receives an address for a LIA-PDN connection from the LIA-PDN 161 and encapsulates an IP packet addressed to the LIA domain network 111 (a node therein) with an IP packet addressed to the address for a PDN connection, thus performing a communication with the LIA domain network 111.

At this time, between the LIA-PDN 161 and the LIA domain network 111 may be directly connected, or may be connected via a connection to the HNB/HeNB 110 (e.g., by establishing a PDN connection) (or between the LIA-PDN 161 and the HNB/HeNB 110 also may be connected using a separate IP-IP tunnel).

In such a method using a secure tunneling, for instance, a packet from the UE 101 is transmitted to a PDN connection for a communication with the LIA domain network 111 (a node therein), and reaches the LIA-PDN 161 by routing at the PGW 160. Herein, the management entity 166 of the LIA-PDN 161 transfers a packet to a secure tunnel communicating with an appropriate HNB/HeNB 110 (or a HGW 110*b*), whereby the HNB/HeNB 110 (HGW 110*b*) receives the packet, detects that the packet is addressed to the LIA domain network 111 based on destination information (or a state, setting and a configuration of the tunneling) and transfers the packet to the LIA domain network 111 (a node therein).

When the HNB/HeNB 110 sets a PDN connection to provide LIA as in a general UE, a packet from the UE 101 is transferred to an appropriate HNB/HeNB 110 by the management entity 165 of the LIA-PDN 161. In this case, a PDN connection between the HNB/HeNB 110 and the LIA-PDN 161 is managed (routing) by a PGW (the PGW 160 of FIG. 1), for example. A connection between these PDNs, control and management relating thereto may be performed by the management entity 165. For instance, when one of the PDN connections is disconnected, another PDN connection also can be disconnected, whereby consistency of a communication connection between the UE 101 and the LIA domain network 111 can be held, and stability of a system as a whole can be improved.

Further, the management entity 165 of the LIA-PDN 161 (or a device similar thereto) may support direct tunneling by the UE 101, so as to transfer (routing) a packet of the UE 101. In this case, assume that the UE 101 does not acquire an IP address capable of routing a packet of the UE 101 to the LIA domain network 111 as it is at the time when the UE 101 sets a PON connection to the LIA-PDN 161. The UE 101 further sets an IP-IP tunnel (e.g., a secure tunnel) to the HNB/HeNB 110 in the allocated PDN connection at the LIA-PDN 161 to connect to the HNB/HeNB 110, and then acquires an IP address to be used at the LIA domain network 111 for use. The HNB/HeNB 110 uses the IP-IP tunnel with the UE 101 (performs transferring) to provide the UE 101 with LIA.

Instead of the IP-IP tunneling (or instead of setting a plurality of PDN connections to the LIA-PDN 161), a bearer as a connection unit of a lower layer in the 3GPP network is considered as the unit of transferring, and a plurality of bearers may be held for each LIA domain network 111 (each IP address) as a target in the PDN connection for one LIA-PDN 161. Different IP bearers of the 3GPP are set (the state where a plurality of IP bearers are contained as a PDN connection in the 3GPP network), and so a communication packet between the UE 101 and the LIA domain network 111 may be tunneled (so as to be distinguishable during a normal connection), whereby each bearer enables a connection to each of a plurality of LIA domain networks 111.

On the other hand, in the MuPDN type connection form, when a PDN connection for LIA is set (established) for the LIA-PDN 161, connections are established to a plurality of different PDNs at the same time so as to achieve a connection in parallel with a normal PDN connection, and a plurality of PDN connections is set (established) for one PDN (multi PDN connection), whereby a different PDN connection can be set (established) for each LIA domain network 111 as a target, and the management entity 165 to perform LIA connects each PDN connection to the corresponding LIA domain network 111 (or performs routing).

That is, in the MuPDN type connection form, a PDN connection is set so as to correspond to a connection between each UE 101 and a LIA domain network 111 as a target. Therefore, the aforementioned first authentication processing (normal access authentication to authenticate as to whether the UE 101 has authority to access the LIA-PDN 161 or not) and the second authentication processing (authentication processing to authenticate as to whether the UE 101 is accessible to the LIA domain network 111 as a connection target or not) have to be performed consecutively (simultaneously). Accordingly, when setting a PDN connection firstly through the 3GPP/non 3GPP network 121 (during processing at Step S203), the UE 101 transmits authentication information (e.g., key information) and information (e.g., an ID of a HeNB network, and an identifier of a UE) to specify one or more LIA domain networks 111 to which the UE 101 requests a connection to an entity (e.g., a PGW) on the network side using PCO or the like, so as to perform the second authentication processing as well as the first authentication processing as indicated in the establishment procedure of a PDN connection in the above.

In the MuPDN type connection form, when the UE 101 already establishes a few PDN connections and further and additionally sets a PDN connection for LIA, the UE 101 transmits the aforementioned information to an entity (e.g., a PGW) on the network side to additionally set a new PDN connection.

Note here that the connection forms between the UE 101 and the LIA domain network 111 may be combined appropriately for use. For instance, even when different connection forms are used for between the UE 101 and the LIA-PDN 161 and between the LIA-PDN 161 and the HNB/HeNB 110, the management entity 165 of the LIA-PDN 161 performs transferring (e.g., routing) of a packet. In another case, although connections to a plurality of LIA domain networks 111 are performed using the MuPDN connection form at the beginning, the connection form may be changed later into the tunnel type connection form (in a new connection, the connection form may be changed to the tunnel type, or a part or all of the existing connections may be shifted to the tunnel type) because the number of PDN connections reaches the upper permissible number of PDN connections established that is specified by an operator or the like. Thereby, a connection to a desired LIA domain network can be established using a suitable connection form in view of the system constraints, and as compared with the case where only one of the connection forms are used, user's convenience can be remarkably improved.

The HNB/HeNB 110 authenticates the HNB/HeNB 110 itself for the 3G network for connection, and as needed (in response to calling from the LIA-PDN 161, for example) sets a connection at a corresponding PDN. At this time, as stated above, the HNB/HeNB 110 may establish a connection to the LIA-PDN 161 by selecting a connection form as needed.

The HNB/HeNB 110 (or HGW 110b) transfers (routing) a packet from the LIA-PDN 161 to the LIA domain network 111. In this respect, it is desirable that a packet from the PGW 160 be easily distinguishable as to whether such a packet is to be transmitted to a terminal that accesses a CSG cell as the HNB/HeNB 110 or is to be transmitted to a node in communication with the UE 101 performing LIA. To this end, it is desirable that the HNB/HeNB 110 perform packet transferring (routing or the like) appropriately by referring to, for example, a different IP-IP tunnel (or a label thereof) and a different data transmission interface and specific PDN connection from those of the PGW 160.

In this way, a packet is transferred (or routed) transparently at the LIA-PDN 161 between the UE 101 and the LIA domain network 111 associated by the management entity 165, and a state where the UE 101 can access the LIA domain network 111 (or the state of directly connecting to the LIA domain network 111 at a layer-3 level) can be implemented (Step S207).

The UE 101 sets a PDN connection for LIA, and receives the allocation of an IP address (or an IP prefix or an IP subnet) there to connect to the LIA domain network 111 and performs a communication with a desired node. Herein, the address allocated to the UE 101 and the usage thereof can be implemented by the following some methods.

For instance, the UE 1010 can use an address structure used in the LIA domain network 111 as it is.

This method is suitable for the case where the LIA domain network 111 is used as a direct operation base of the UE 101 (home or office of the owner and users of the UE 101) because the packet processing load on the UE 101 is small and the UE 101 can behave as if it directly connected to the LIA domain network 111.

In this case, the UE 101 receives the allocation of an IP address (or an IP prefix or an IP subnet) that can be directly used at the LIA domain network 111 during the setting (establishing) procedure of a PDN connection (the UE may request during the setting procedure). When transmitting/receiving a packet, a packet is transferred at the LIA-PDN 161 (e.g., layer-2 bridge). At this time, at the LIA-PDN 111, association of the PDN connection of the UE 101 confirmed during authentication with a connection (e.g., a PDN connection, another logical 3GPP interface or an IP tunnel) to the HNB/HeNB 110 configuring the LIA domain network 111 as a target is managed, and a packet is transferred mutually.

In another configuration, the UE 101 may receive the allocation of an address in any IP address structure by the management entity 165 of the LIA-PDN 111, and a packet may be routed by one or more IP routing entities (or gateway devices) placed on the network side.

In this method, the IP address itself allocated to the UE 101 is freely set by the LIA-PDN 165, and a routing entity at an IP layer transmits/receives a packet with the LIA domain network 111. Therefore there is no need to prepare an IP address for the UE 101 in the LIA domain network 111, and so this configuration is suitable for the case where a temporary LIA is provided to the UE 101.

In the case where a user is an unauthorized person, a user having temporal access permission, a visitor or a guest user, security check and virus check of a packet may be performed when the management entity 165 (or a similar node) transfers the packet. Thereby, the LIA domain network 111 can be protected against an attack by malicious unauthorized persons. Herein, the management entity 165 (or a similar node) may operate as a NAT or an AGW (Application Gateway).

In this case, the UE 101 receives the allocation of any IP address at the LIA-PDN 161 during the setting (establishing) procedure of a PDN connection (the UE may request during the setting procedure). When transmitting/receiving a packet, a packet routing is performed at the LIA-PDN 161. At this time, at the LIA-PDN 161, association of the IP address allocated to the UE 101 with a connection (e.g., a PDN connection or another logical 3GPP interface) to the HNB/HeNB 110 configuring the LIA domain network 111 as a target is managed, and a packet is routed mutually.

Alternatively, the UE 101 receives the allocation of an address in any address structure by the management entity 165 of the LIA-PDN 161 for example, and uses, in an IP-IP tunnel using the address, an address of the address structure used in the LIA domain network 111.

In this method, the IP address itself allocated to the UE 101 is freely set at the LIA-PDN 161, and the UE 101 sets an IP-IP tunnel with a node (mainly a gateway device (or a gateway function) added to the HNB/HeNB 110 or the HGW 110b) in the LIA domain network 111 and receives therein the allocation of an IP address that can be used in the LIA domain network 111. Therefore, the procedure to check the UE 101 in the LIA domain network 111 is simple, and the UE 101 can be managed as occasion demands. For these reasons, this method is suitable for providing a relatively large-scale LIA (such as remote access to a is cooperate network).

In this case, the UE 101 receives the allocation of any IP address at the LIA-PDN 161 during the setting (establishing) procedure of a PDN connection (the UE may request during the setting procedure). When transmitting/receiving a packet, a packet routing is performed at the LIA-PDN 161. At this time, at the LIA-PDN 165, association of the IP address allocated to the UE 101 with a connection (e.g., a PDN connection or another logical 3GPP interface) to the HNB/HeNB 110 configuring the LIA domain network 111 as a target is managed, and a packet is routed mutually. Further, a node (mainly a gateway device (or a gateway function) added to the HNB/HeNB 110 or the HGW 110b) in the LIA domain network 111 provides the UE 101 with an address that can be used in the LIA domain network 111, and therefore the setting procedure of an IP-IP tunnel is performed with the UE 101, and while an appropriate IP address is allocated to the UE 101, the UE 101 can be additionally managed (management as to how to deal with an IP-IP tunnel) on the basis of other policies.

With the aforementioned operation, even when the UE 101 is not placed in the environment capable of physically accessing the HNB/HeNB 110 (or the HGW 110b), the UE 101 can connect to a network (LIA domain network 111) belonging to the HNB/HeNB 110 via the LIA-PDN 161 from the 3GPP/non 3GPP network 121, thus achieving LIA.

According to the aforementioned embodiments of the present invention, a UE 101 at a remote place can perform LIA to the LIA domain network 111 with simpler procedure and such a configuration while achieving the efficiency of costs and facility. More specifically, the following effects can be achieved by the aforementioned embodiments of the present invention.

The HNB/HeNB 110 does not have to be provided with a function corresponding to a PGW or a SGW, and by simply adding a router function thereto, the HNB/HeNB 110 capable of providing LIA at a relatively low cost can be achieved. By simply transferring (e.g., routing) a packet, the HNB/HeNB 110 can provide LIA, while providing a 3GPP access network such as a normal CSG access.

The PDNs as the LIA-PDN 161 and APNs as identification information thereon do not have to be prepared in number corresponding to the number of the HNB/HeNBs 110, and a limited number of the LIA-PDNs 161 and the APNs can realize LIA by a large number of UEs 101. As a result, address space necessary to allocate the identification information can be greatly reduced.

Further, the HNB/HeNB 110 does not have to perform authentication as PDNs, and security for the network side can be secured within the range of normal authentication processing (with only additional information such as capability of providing LIA). As a result, maintenance costs and device costs to secure security can be reduced.

Further, the UE 101 performs LIA by connecting to the LIA-PDN 161 via a SGW (SGW 151a) similar to a normal communication from the 3GPP/non 3GPP network 121, and therefore there is no need to implement functions, procedure and databases to search for a special SGW, and device costs for the UE 101 itself can be reduced.

When the UE 101 accesses the HNB/HeNB 110 exactly configuring the LIA domain network 111, efficiency may be better in a direct connection to the LIA domain network 111 than in a connection via the LIA-PDN 161. In such a case, optimization of Local-LIA may be performed.

For instance, when an access request is made from the UE 101 through the same path as a connection from the LIA-PDN 161 (i.e., a connection path where the UE 101 requests to perform LIA and a connection path to the LIA domain network 111 as a target are the same), or when a packet turns back to substantially the same HNB/HeNB 110 even when logical connections thereof are different, a part of the packet path between the UE 101 and the LIA domain network 111 becomes redundant. In such a case, the management entity 165 of the LIA-PDN 161 or an entity called a mobility management entity (MME) receiving such an instruction may urge the HNB/HeNB 110 to optimize the path.

In the case of a relatively large-scale LIA domain network 111, a management entity of the LIA domain network 111 may mange the LIA-PDN 161 (further a PGW for a connection to the LIA-PDN 161) as well using an operation method known as MVNO (Mobile Virtual Network Operator). This case has an advantage of facilitating management and operations of access authentication information at the LIA domain network 111 that is necessary for LIA.

The aforementioned embodiments assume that the HNB/HeNB 110 configures the LIA domain network 111. Instead, the present invention can be embodied using a router or a gateway device as well (e.g., the HGW 110b as described above or a local gateway (L-GW)) capable of configuring the LIA domain network 111 (a network to which the UE 101 wants to access externally via a 3GPP network) such as a domestic network.

The aforementioned embodiments describe the case where the UE 101 at a remote place performs LIA to the LIA domain network 111. The processing according to the present invention further enables transferring of information on a network node connected to the LIA domain network 111 as a target of the LIA to a network node connected to another LIA domain network.

The other LIA domain network may belong to the same operator or belong to a different operator. A HPLMN in the other LIA domain network may be the same as the HPLMN in the LIA domain network 111 with which the UE 101 performs LIA or be different therefrom.

Such a request is generated, for example, when the UE 101 starts a communication with a network node connecting to a LIA domain network 111 different from a network node connecting to the LIA domain network 111 as a target of the LIA, or when the UE 101 wants to connect to both of them simultaneously. Specifically this is the case where a user wants to transfer data from his/her data server placed at home to a friend's data server placed at the friend's home (the user is away from home) or the case where a user wants to fetch information from his/her data server placed at home and from a friend's data server placed at the friend's home simultaneously, for example.

In these cases, the connection procedure by the UE 101 to the LIA domain network 111 is performed as in the aforementioned embodiments to perform LIA to the LIA domain network 111 as a target, while performing LIA to another LIA domain network similarly. To this end, the UE 101 has to complete authentication so as to receive permission for connections to both of the LIA domain networks (the LIA domain network 111 and the other LIA domain network). Next, the UE 101 transmits a routing request (or inter-LIA domain connection request) to the LIA-PDN so as to enable connections (e.g., routing) between these LIA domain networks from the connections to these LIA domain networks. Herein the routing request (inter-LIA domain connection request) may be made simultaneously with the first LIA domain network connection (incorporating the request to the routing request at the time of a connection request) or may be made simultaneously with a connection request to the LIA domain network as a target (alternatively, any connection request may make a routing request simultaneously or every connection request may make a routing request simultaneously). This request preferably includes information requesting a connection between LIA domain networks and an identifier (or a list of identifiers) of the LIA domain network as a target. From security viewpoint and a mutual connectivity view point when the networks use local addresses, it is desirable that mutual authentication of nodes in the LIA domain networks be performed to perform transmission/reception between the LIA domain networks or agreement on an address to be used be made prior to actual transmission/reception of data (e.g., a not-interfering address is reallocated or a not-interfering address is allocated at the time of the original address allocation). At this time, the LIA-PDN 161 or the PGW 160, the management entity 165, an end node performing transmission/reception and the like may perform address conversion, termination of secure protocol or the like.

As the actual procedure for data transmission/reception, for further security, it is desirable that authentication information and address information be passed via a UE 101, to which authentication has been performed already in the LIA domain network as a target, or that just a temporary reception address and a tentative transmission destination address be shown to both of the entities involved in the transmission/reception in the LIA domain network, and the UE 101 perform actual data transmission processing and transferring between the LIA domain networks is performed at the LIA-PDN 161. Especially in the latter case, the UE 101 can function as a remote controller, leading to the effect of improved user's convenience.

As one of the methods to let the UE 101 control, like a remote controller, each transmission/reception entity in a plurality of LIA domain networks to transmit data, for instance, when an entity of one of the LIA domain networks is an image storage device, and an entity of the other LIA domain network is an image display device, the UE 101 effectively controls the image display device to display image contents in the image storage device. Herein the UE 101 accesses the image storage device by LIA to control to set desired image contents at a reproduction (transmission) state and transmit the contents to a target address (e.g., an address of the UE 101, a tentatively set transmission destination address, an address of the image display device), while accessing the image display device by LIA via another LIA domain network to control to set the image contents at a display (reception) state and receive the contents from the target address (e.g., an address of the UE 101, a tentatively set transmission source address, an address of the image storage device). The devices as a control target (e.g., the image storage device and the image display device as above) may be a communication device not only operating in a fixed usage method of transmission/reception but also communicating with each other. The UE 101 can control these devices also in a similar manner.

The above-stated exemplary procedure to connect a plurality of LIA domain networks describes the case where the UE 101 performs LIA with the respective LIA domain networks prior to connections. Instead, in the state where the UE 101 completes a connection to the LIA domain network 111 and performs a communication to the LIA, and during the authentication procedure for LIA with another LIA domain network that the UE 101 wants to connect, the UE 101 further may notice so as to make a request for a connection of the other LIA domain network with the LIA domain network 111 previously connected thereto. This procedure can reduce the traffic amount concerning signaling.

Further also when the UE connects to a LIA domain network belonging to a HNB/HeNB different from the LIA domain network 111 as a target of LIA, a request from the UE 101 is processed at the management entity 165 of the LIA-PDN 161. For instance, the management entity 165 of the LIA-PDN 161 establishes a connection with a new LIA domain network as an additional transfer destination, whereby LIA to the new LIA domain network can be implemented in a quite simple manner without requiring the procedure such as roaming between operators.

Each functional block used in the description of the above-stated embodiments may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used.

Further, if a technique for integrated circuit that replaces LSIs becomes available with the development of a semiconductor technique or derived techniques, functional blocks may be naturally integrated using such a technique. For instance, biotechnology may be applied thereto.

INDUSTRIAL APPLICABILITY

The present invention has an effect of enabling a UE 101 at a remote place to perform LIA to a LIA domain network 111 with simpler procedure and such a configuration while achieving the efficiency of costs and facility. The present invention relates to a communication technique for enabling a user equipment in a certain network to access resources in another network, and more particularly relates to a communication technique related to local IP accesses by a mobile user equipment.

The invention claimed is:

1. A user equipment capable of performing a local IP access to a first network in a communication system, the communication system enabling the user equipment to perform a local IP access to the first network while connecting the user equipment to a second network that is physically different from the first network, the user equipment comprising:
    a unit that transmits, to a packet data network for local IP access placed in a core network, information necessary for authentication of a local IP access to the first network when establishing a first packet data network connection with the packet data network for local IP access capable of dealing with a local IP access by the user equipment;
    a unit that performs, when the packet data network for local IP access performs authentication processing concerning the local IP access by the user equipment to the first network and validity thereon is confirmed, a local IP access to the first network via the first packet data network connection and a second packet data network connection, the second packet data network connection being established by the packet data network for local IP access between the first network and the packet data network for local IP access;
    a unit that transmits, when a local IP access is performed to a third network to which the user equipment is local-IP accessible using the packet data network for local IP access, or when the local IP access is already performed, to the packet data network for local IP access, an inter-network connection request including information to set a connection between the first network and the third network; and
    a unit that controls, when a communication is performed between a node in the first network and a node in the third network, a communication operation of the node in the first network and a communication operation of the node in the third network.

2. The user equipment according to claim 1, further comprising a unit that transmits, to the second network, information to specify the packet data network for local IP access.

3. The user equipment according to claim 2, wherein the information to specify the packet data network for local IP access includes an access point name assigned unique to the packet data network for local IP access.

4. The user equipment according to claim 1, further comprising a unit that transmits, to the packet data network for local IP access, information necessary for the packet data network connection.

5. The user equipment according to claim 4, wherein information necessary for the packet data network connection and information necessary for authentication of the local IP access to the first network are transmitted with a same message.

6. The user equipment according to claim 4, wherein the information necessary for authentication of the local IP access to the first network includes information to specify the first network and identification information on the user equipment for a local IP access to the first network.

7. The user equipment according to claim 1, wherein the user equipment performs a local IP access to the first network such that a data packet is transmitted from the user equipment to the packet data network for local IP access via the first packet data network connection and said data packet is transmitted from the packet data network for local IP access to the first network via the second packet data network connection.

8. A communication node in a packet data network for local IP access placed in a core network, the packet data network for local IP access being capable of dealing with a local IP access by a user equipment capable of performing a local IP access to a first network in a communication system, the communication system enabling the user equipment to perform a local IP access to the first network while connecting the user equipment to a second network that is physically different from the first network, the communication node comprising:
    a unit that receives information necessary for authentication of a local IP access to the first network, the information being transmitted when the user equipment establishes a first packet data network connection with the packet data network for local IP access;
    a unit that performs, on a basis of the information necessary for authentication of a local IP access to the first network, authentication processing concerning the local IP access by the user equipment to the first network;
    a unit that, when validity of the local IP access by the user equipment to the first network is confirmed in the authentication processing, establishes a second packet data network connection with the first network for the user equipment to perform the local IP access to the first network, wherein the user equipment performs a local IP access to the first network via the first packet data network connection and the second packet data network connection;
    a unit that receives, when the user equipment performs a local IP access to a third network to which the user equipment is local-IP accessible using the packet data network for local IP access, or when the user equipment already performs the local IP access, from the user equipment an inter-network connection request including information to set a connection between the first network and the third network; and
    a unit that establishes, in response to the inter-network connection request, a connection between the first network and the third network.

9. The communication node according to claim 8, further comprising:
    a unit that performs authentication processing concerning establishment of the packet data network connection by the user equipment; and
    a unit that performs authentication processing concerning the local IP access by the user equipment to the first network.

10. The communication node according to claim 8, wherein the user equipment performs a local IP access to the first network such that a data packet is transmitted from the user equipment to the packet data network for local IP access via the first packet data network connection and said data packet is transmitted from the packet data network for local IP access to the first network via the second packet data network connection.

11. A method for performing a local IP access to a first network in a communication system, the communication system enabling the user equipment to perform a local IP access to the first network while connecting the user equipment to a second network that is physically different from the first network, the method comprising:
- transmitting, to a packet data network for local IP access placed in a core network, information necessary for authentication of a local IP access to the first network when establishing a first packet data network connection with the packet data network for local IP access capable of dealing with a local IP access by the user equipment;
- performing, when the packet data network for local IP access performs authentication processing concerning the local IP access by the user equipment to the first network and validity thereon is confirmed, a local IP access to the first network via the first packet data network connection and a second packet data network connection, the second packet data network connection being established by the packet data network for local IP access between the first network and the packet data network for local IP access;
- transmitting, when a local IP access is performed to a third network to which the user equipment is local-IP accessible using the packet data network for local IP access, or when the local IP access is already performed, to the packet data network for local IP access, an inter-network connection request including information to set a connection between the first network and the third network; and
- controlling, when a communication is performed between a node in the first network and a node in the third network, a communication operation of the node in the first network and a communication operation of the node in the third network.

12. The method according to claim 11, wherein the user equipment performs a local IP access to the first network such that a data packet is transmitted from the user equipment to the packet data network for local IP access via the first packet data network connection and said data packet is transmitted from the packet data network for local IP access to the first network via the second packet data network connection.

13. A method for a communication node in a packet data network for local IP access placed in a core network, the packet data network for local IP access being capable of dealing with a local IP access by a user equipment capable of performing a local IP access to a first network in a communication system, the communication system enabling the user equipment to perform a local IP access to the first network while connecting the user equipment to a second network that is physically different from the first network, the method comprising:
- receiving information necessary for authentication of a local IP access to the first network, the information being transmitted when the user equipment establishes a first packet data network connection with the packet data network for local IP access;
- performing, on a basis of the information necessary for authentication of a local IP access to the first network, authentication processing concerning the local IP access by the user equipment to the first network;
- establishing, when validity of the local IP access by the user equipment to the first network is confirmed in the authentication processing, a second packet data network connection with the first network for the user equipment to perform the local IP access to the first network, wherein the user equipment performs a local IP access to the first network via the first packet data network connection and the second packet data network connection;
- receiving, when the user equipment performs a local IP access to a third network to which the user equipment is local-IP accessible using the packet data network for local IP access, or when the user equipment already performs the local IP access, from the user equipment an inter-network connection request including information to set a connection between the first network and the third network; and
- establishing, in response to the inter-network connection request, a connection between the first network and the third network.

14. The method according to claim 13, wherein the user equipment performs a local IP access to the first network such that a data packet is transmitted from the user equipment to the packet data network for local IP access via the first packet data network connection and said data packet is transmitted from the packet data network for local IP access to the first network via the second packet data network connection.

* * * * *